United States Patent [19]

Winter et al.

[11] 4,136,581

[45] Jan. 30, 1979

[54] CONTINUOUSLY ADJUSTABLE TRANSMISSION WITH TWO SPEED RANGES

[75] Inventors: August Winter, Friedrichshafen; Anton Ott, Tettnang, both of Germany

[73] Assignee: Zahnradfabrik Friedrichshafen Aktiengesellschaft, Friedrichshafen, Germany

[21] Appl. No.: 793,889

[22] Filed: May 4, 1977

[30] Foreign Application Priority Data

May 15, 1976 [DE] Fed. Rep. of Germany ....... 2621682

[51] Int. Cl.$^2$ .......................................... F16H 37/08
[52] U.S. Cl. .............................. 74/689; 74/230.17 A
[58] Field of Search ......... 74/689, 230.17 A, 665 GE, 74/700, 701, 722

[56] References Cited

U.S. PATENT DOCUMENTS

| 3,376,760 | 4/1968 | Gordanier | 74/689 |
| 4,056,987 | 11/1977 | Hoffman | 74/689 |

*Primary Examiner*—Allan D. Herrmann
*Assistant Examiner*—Frank H. McKenzie, Jr.
*Attorney, Agent, or Firm*—Karl F. Ross

[57] ABSTRACT

A drive shaft and a driven shaft are linked through a differential gearing which distributes the applied torque over two coaxial satellite shafts. One of the satellite shafts is directly connected with the driven shaft through a first steplessly variable split-sheave coupling of the Reeves type while the other satellite shaft, which is immobilizable by a brake, is connected through a second such coupling with an intermediate shaft which in turn can be coupled with the driven shaft via a clutch. With both the brake and the clutch released, the system idles; with the clutch operated, the torque transmitted from the drive shaft to the driven shaft varies inversely with the speed ratio of the two synchronized split-sheave couplings whereas actuation of the brake in lieu of the clutch doubles the output speed and halves the transmitted torque. If only unidirectional rotation is to be transmitted, the clutch can be replaced by a one-way coupling which lets the driven shaft rotate freely when the brake is engaged.

7 Claims, 4 Drawing Figures

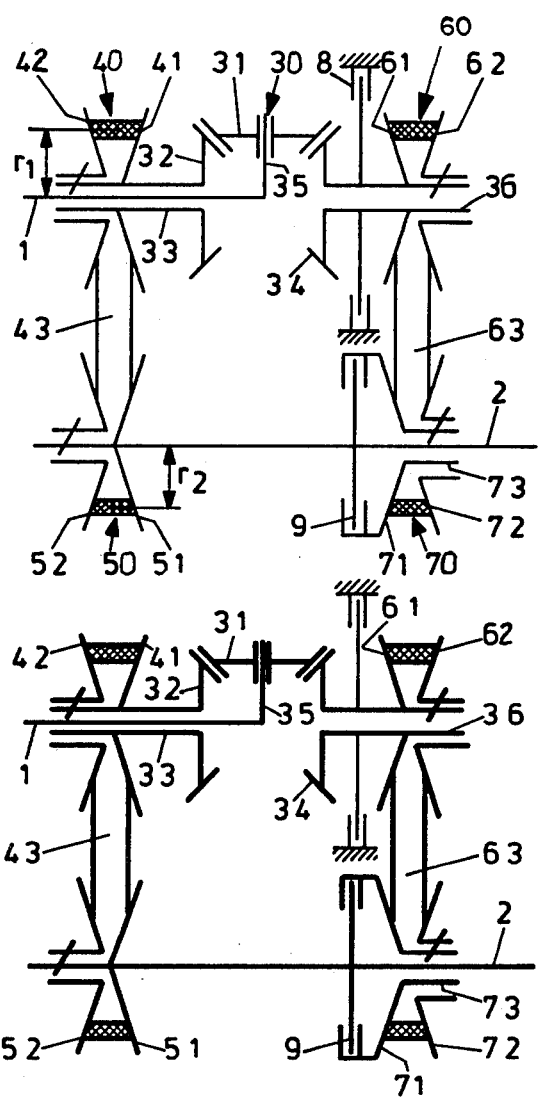
FIG. 1
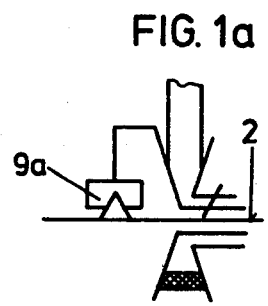
FIG. 1a
FIG. 2
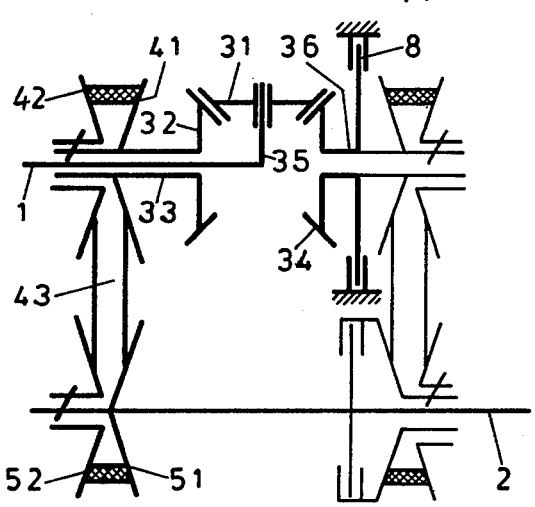
FIG. 3

CONTINUOUSLY ADJUSTABLE TRANSMISSION WITH TWO SPEED RANGES

FIELD OF THE INVENTION

Our present invention relates to a continuously adjustable transmission to be inserted between a source of motive power, e.g. an automotive engine, and a load, such as the traction wheels of a vehicle.

BACKGROUND OF THE INVENTION

In a steplessly variable transmission known as a Reeves coupling, two split sheaves or pulleys mounted on respective shafts are interconnected by a flexible link such as a V-belt, each sheave being divided into two halves in the shape of frustoconical cheeks which are relatively axially displaceable in order to vary the radius of the zone of contact between the belt and the sheave. Complementary changes in the cheek spacing of the two interconnected sheaves allow the speed ratio R of the two shafts to be continuously adjusted, according to the formula $R = r_1/r_2$ where $r_1$ is the effective radius of the driving sheave and $r_2$ is the effective radius of the driven sheave. It is also possible in such a coupling to employ a single split sheave on one of the shafts and a pulley of constant diameter on the other shaft, so long as means are provided for keeping the belt taut regardless of the selected speed ratio.

Various combinations of such a Reeves coupling with differential gears and stepped speed changers have already been proposed for the purpose of extending the range of available speed ratios; see, for example, German Pat. No. 887,457 and German utility model No. 1,991,834.

OBJECT OF THE INVENTION

The object of our present invention is to provide a continuously adjustable transmission with two speed ranges which can be selectively established by the simple actuation or release of a preferably hydraulic coupling element such as a clutch or a brake.

SUMMARY OF THE INVENTION

We realize this object, in accordance with our present invention, by the provision of a differential gearing whose summing input is connected with a drive shaft connectable to the power source and whose differential outputs are connected with a pair of satellite shafts, one of these latter shafts being connected with a driven shaft through a first steplessly variable coupling whereas the other satellite shaft is connected through a second steplessly variable coupling to an intermediate shaft; the two steplessly variable couplings are preferably of the aforedescribed Reeves type with two split sheaves each. The driven shaft is also entrainable by the intermediate shaft, upon the release of a brake serving to immobilize the last-mentioned satellite shaft, through a coupling which may comprise a selectively engageable clutch or a permanently engaged one-way coupling.

BRIEF DESCRIPTION OF THE DRAWING

The above and other features of our invention will now be described in detail with reference to the accompanying drawing in which:

FIG. 1 diagrammatically illustrates a transmission according to our invention in idling position;

FIG. 1a shows a partial modification of the system of FIG. 1;

FIG. 2 shows the system of FIG. 1 set for a first range of speed ratios; and

FIG. 3 shows the same system set for a second range of speed ratios.

SPECIFIC DESCRIPTION

As shown in FIG. 1, a drive shaft 1 connected to a nonillustrated engine or other source of motive power is joined to a summing input 35 of a differential gearing 30, this summing input being for example a pinion engaging a ring gear on a differential housing carrying planet gears 31 in mesh with two sun gears 32 and 34. The two sun gears 32 and 34, representing the differential outputs of gearing 30, are mounted on a pair of coaxial satellite shafts 33 and 36, shaft 33 being tubular and surrounding the drive shaft 1. A driven shaft 2, coupled to a nonillustrated load, is linked with satellite shaft 33 by way of a Reeves coupling including a pair of split sheaves 40 and 50 linked by a belt 43. Sheave 40 has a cheek 41 rigid with shaft 33 and a sheave 42 axially slidable therewith by a speed-changing mechanism not further illustrated. The same speed-changing mechanism adjusts a movable cheek 52 of sheave 50 whose other cheek 51 is rigid with shaft 2; these adjustments are so correlated that the effective radius $r_1$ of sheave 40 varies inversely with reference to the effective radius $r_2$ of sheave 50, leaving the sum $r_1 + r_2$ essentially constant.

In an analogous manner, satellite shaft 36 is linked with an intermediate shaft 73 through another Reeves coupling comprising a split sheave 60, with a cheek 61 fixed on shaft 36 and a cheek 62 axially movable relatively thereto, and a sheave 70 having a cheek 71 integral with shaft 73 and an axially shiftable cheek 72, the two sheaves being interconnected by a belt 63. The movable sheave halves 62 and 72 are also linked to the speed-changing mechanism so as to move in unison with cheeks 52 and 42, respectively, whereby the effective radii of sheaves 60 and 70 have the same values $r_1$ and $r_2$ as those of sheaves 40 and 50.

A preferably hydraulic brake 8 is engageable with shaft 36 to arrest it along with Reeves coupling 60, 63, 70. A preferably hydraulic clutch 9, operable to couple the intermediate shaft 70 with driven shaft 2, can be engaged only in the released condition of brake 8.

In FIG. 1 we have shown both control elements 8 and 9 unoperated so that, with driven shaft 2 held back by the resistance of the load, shaft 36 is freely rotatable and absorbs practically the entire input torque $M_1$ applied to shaft 1. Thus, the system is in its idling state and the load is not driven.

In the position of FIG. 2, brake 8 is still released but clutch 9 has been engaged so that driven shaft 2 receives the two components of the input torque $M_1$ distributed by gearing 30 between satellite shafts 33 and 36. As a result, driven shaft 2 rotates at a speed $n_2 = Rn_1$ where $n_1$ is the speed of drive shaft 1. The torque ratio between drive shaft 1 and driven shaft 2 varies inversely with speed ratio so that the output torque $M_2$ has the value $M_2 = M_1/R$.

With the clutch 9 disengaged and the brake 8 engaged as shown in FIG. 3, satellite shaft 36 is immobilized while satellite shaft 33 rotates at twice the speed of drive shaft 1. The speed of output shaft 2 is now given by $n_2 = 2n_1R$ while its torque $M_2$ is equal to $M_1/2R$.

Thus, if the maximum speed ratio $R_{max}$ attainable by either Reeves coupling equals twice its minimum speed ratio $R_{min}$, a continuous variation of speed ratios from $R_{min}$ to $2R_{max}$ can be achieved.

The arrangement shown in FIGS. 1-3 allows the load to be gradually accelerated from standstill by a slow engagement of the clutch 9. If, however, the driven shaft 2 is to be rotated only unidirectionally and is coupled with its load through a separate clutch, the selectively engageable clutch 9 can be replaced by a permanently engaged one-way coupling 9a of the freewheel or overrunning-clutch type as shown in FIG. 1a. In this case, only the brake 8 needs to be actuated or released in order to shift from the lower to the higher speed range or vice versa; with the brake engaged to immobilize the shaft 36, the driven shaft 2 will not be restrained by the one-way coupling. For idling it will, however, be necessary to release the aforementioned separate clutch (not shown).

We claim:

1. A continuously adjustable transmission inserted between a source of motive power and a load, comprising:
   a drive shaft connectable to said source;
   a driven shaft connectable to said load;
   differential gear means having a summing input connected with said drive shaft and two differential outputs connected with a pair of satellite shafts;
   a first steplessly variable coupling connecting one of said satellite shafts with said driven shaft;
   a second steplessly variable coupling connecting the other of said satellite shafts with an intermediate shaft;
   brake means engageable with said other of said satellite shafts for immobilizing same together with said intermediate shaft; and
   coupling means enabling entrainment of said driven shaft by both satellite shafts at a lower speed in a disengaged state of said brake means and by said one of said satellite shafts at a higher speed in an engaged state of said brake means.

2. The transmission defined in claim 1 wherein each of said steplessly variable couplings comprises a pair of split sheaves linked by an endless traction element.

3. The transmission defined in claim 2 wherein each split sheave has a first half fixed to the respective shaft and second half axially shiftable with reference to said first half.

4. The transmission defined in claim 1 wherein said satellite shafts are coaxial with each other, one of said satellite shafts being tubular and surrounding said drive shaft.

5. The transmission defined in claim 1 wherein said intermediate shaft is tubular and surrounds said driven shaft.

6. The transmission defined in claim 1 wherein said coupling means comprises a selectively engageable clutch.

7. The transmission defined in claim 1 wherein said coupling means comprises a permanently engaged one-way coupling.

* * * * *